(12) United States Patent
Fukue

(10) Patent No.: US 7,864,318 B2
(45) Date of Patent: Jan. 4, 2011

(54) SPECTROSCOPIC ELLIPSOMETER AND ELLIPSOMETRY

(75) Inventor: Kumiko Fukue, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 144 days.

(21) Appl. No.: 12/236,178

(22) Filed: Sep. 23, 2008

(65) Prior Publication Data

US 2009/0109438 A1    Apr. 30, 2009

(30) Foreign Application Priority Data

Oct. 24, 2007    (JP)    ............................ P2007-276106

(51) Int. Cl.
*G01J 4/00*    (2006.01)
(52) U.S. Cl. ..................................... 356/369
(58) Field of Classification Search ........................ None
See application file for complete search history.

(56) References Cited

U.S. PATENT DOCUMENTS 5,956,144 A * 9/1999 Kaplan et al. ............... 356/364
7,385,697 B2 * 6/2008 Woollam et al. ............ 356/369
2004/0233437 A1   11/2004 Horie

FOREIGN PATENT DOCUMENTS

JP    2005-003666    1/2005

* cited by examiner

*Primary Examiner*—Tu T Nguyen
(74) *Attorney, Agent, or Firm*—McDermott Will & Emery LLP

(57) ABSTRACT

A spectroscopic ellipsometer has a polarized light generating part for generating elliptically polarized lights of a plurality of wavelengths included in a predetermined measurement wavelength band from white light and directing the elliptically polarized lights to a measurement surface of a substrate, a rotating analyzer where reflected light reflected on the measurement surface enters, and a spectrometer for acquiring spectral intensity of light from the rotating analyzer. A polarization state acquiring part in a control part acquires a polarization state at each wavelength in the measurement wavelength band of the reflected light. The optical characteristic calculation part obtains a film thickness on the measurement surface with high accuracy on the basis of differences between measurement values and theoretical values, the measurement values representing change of a complex amplitude ratio between a p-polarized component and an s-polarized component and a phase difference between a p-polarized component and an s-polarized component.

17 Claims, 5 Drawing Sheets

SPECTROSCOPIC ELLIPSOMETER AND ELLIPSOMETRY

BACKGROUND OF THE INVENTION

1. Field of the Invention

The present invention relates to a spectroscopic ellipsometer and an ellipsometry on an object.

2. Description of the Background Art

Conventionally, an ellipsometer is used as an optical measuring apparatus for measuring a thickness or an optical constant of a film formed on a semiconductor substrate (hereinafter, referred to as "substrate") or the like. In the ellipsometer, polarized light is applied to a measurement surface of the substrate so as to incline to the measurement surface, a polarization state of reflected light reflected on the measurement surface is acquired and ellipsometry is performed to measure a film thickness or the like on the substrate. For example, Japanese Patent Application Laid-Open No. 2005-3666 (Document 1) discloses a spectroscopic ellipsometer for performing film thickness measurement and the like on a thin film formed on a substrate on the basis of a polarization state of a light at each wavelength of the reflected light.

In recent, with high definition of a pattern formed on a substrate, reduction of a film thickness on the substrate is further proceeding and it is required in the ellipsometer to achieve high precision of ellipsometry which is performed on a very fine film.

In the spectroscopic ellipsometer like in Document 1, a visible light including lights of a plurality of wavelengths is linearly polarized and applied to the substrate, and a reflected light reflected on the substrate is received to perform ellipsometry. In ellipsometry performed on a very fine film, however, measurement by entering a circularly polarized light to the substrate can increase change of outputted signal by change of film thickness, in comparison with measurement by entering linearly polarized lights to the substrate. Therefore, if ellipsometry is performed with a spectroscopic ellipsometer using the linearly polarized lights, the measurement accuracy is decreased in comparison with a laser-type ellipsometer for applying a circularly polarized laser beam (i.e., a light of one wavelength) to a substrate. At present, there is no polarizer which is capable of changing all lights of a plurality of wavelengths entering a substrate to circularly polarized lights in the spectroscopic ellipsometer.

In the spectroscopic ellipsometer, the measurement accuracy on a very fine film can be increased by using ultraviolet light as light applied to a substrate. However, in this case, since optical elements used in an optical system of the spectroscopic ellipsometer are expensive and special, the manufacturing cost of the spectroscopic ellipsometer is increased and usage environment of the spectroscopic ellipsometer is limited. In a case where a wavelength of ultraviolet light used is equal to or smaller than 200 nm, the spectroscopic ellipsometer should be used in vacuum atmosphere. Further, there is a possibility that the substrate is affected by application of the ultraviolet light.

On the other hand, in the laser-type ellipsometer, since only one wavelength of light is used for ellipsometry, measurement on a multilayer film is not suitable, and the measurement accuracy is decreased in measurement on a film with a specific thickness.

SUMMARY OF THE INVENTION

The present invention is intended for a spectroscopic ellipsometer. It is an object of the present invention to perform ellipsometry on an object with high accuracy.

The spectroscopic ellipsometer comprises: a light source; a polarized light generating part for generating a multiple wavelength polarized light directed to an object by acquiring elliptically polarized lights from lights of a plurality of wavelengths, the lights being emitted from the light source, or by acquiring a circularly polarized light from a light of a specific wavelength included in the plurality of wavelengths and acquiring an elliptically polarized light from a light of another wavelength included in the plurality of wavelengths; a rotating analyzer where a reflected light of the multiple wavelength polarized light enters, the rotating analyzer rotating around a central axis parallel to an optical axis; a spectrometer for receiving a light directed from the rotating analyzer to acquire spectral intensity; and a polarization state acquiring part for acquiring a polarization state at each of the plurality of wavelengths of the reflected light on the basis of output of the spectrometer. With this structure, it is possible to perform ellipsometry on the object with high accuracy in comparison with a spectroscopic ellipsometer where an incident light is linearly polarized lights of a plurality of wavelengths.

According to a preferred embodiment of the present invention, the polarized light generating part comprises: a polarizer for acquiring linearly polarized lights from the lights of the plurality of wavelengths; and a wave retardation plate for acquiring an elliptically polarized light or a circularly polarized light from each of the linearly polarized lights.

According to another preferred embodiment of the present invention, the spectroscopic ellipsometer further comprises a calculation part for obtaining a value of at least one optical characteristic of the object on the basis of differences between measurement values in the plurality of wavelengths and theoretical values where at least one optical characteristic is a variable, the measurement values representing a phase difference between a p-polarized component and an s-polarized component and a complex amplitude ratio between a p-polarized component and an s-polarized component or representing the phase difference between the p-polarized component and the s-polarized component and change of a complex amplitude ratio between a p-polarized component and an s-polarized component in reflection on the object. More preferably, at least one optical characteristic includes a thickness of a film formed on the object or a refractive index of the film.

According to still another preferred embodiment of the present invention, the polarized light generating part acquires a circularly polarized light from a light of a specific wavelength included in the plurality of wavelengths. With this structure, it is possible to improve the accuracy of ellipsometry on the object.

According to still another preferred embodiment of the present invention, the light source is a white light source, and the lights of the plurality of wavelengths are included in a predetermined wavelength band out of white light which is emitted from the light source. More preferably, a minimum wavelength of the predetermined wavelength band is equal to or larger than 300 nm.

The present invention is also intended for an ellipsometry on an object.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
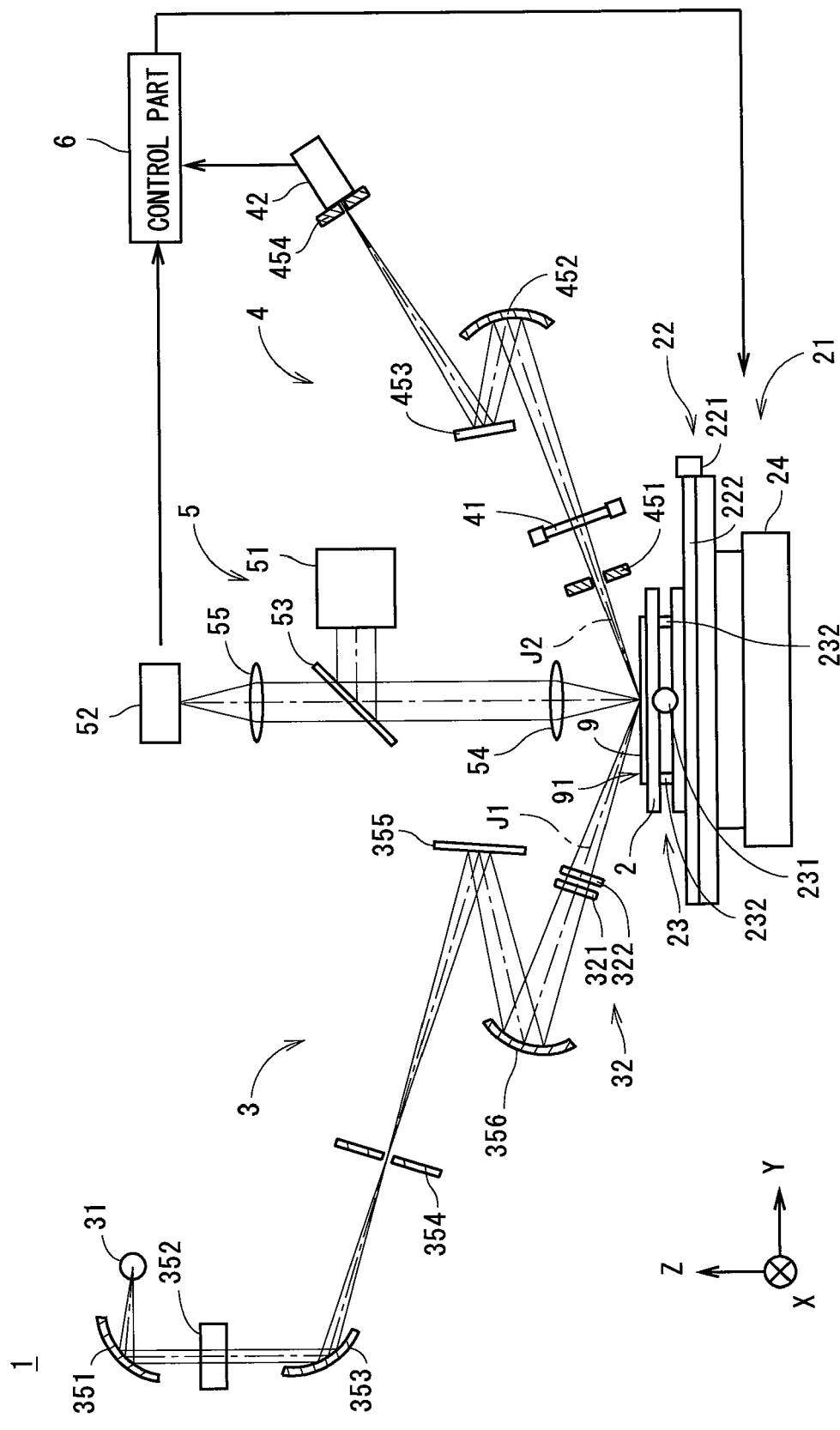
FIG. 1 is a view showing a structure of a spectroscopic ellipsometer.

FIG. 1 is a view showing a structure of a spectroscopic ellipsometer 1 in accordance with a preferred embodiment of the present invention. The spectroscopic ellipsometer 1 is an apparatus for measuring a thickness of a thin film formed on a semiconductor substrate 9 (hereinafter, simply referred to as "substrate 9") which is a measurement object. In the spectroscopic ellipsometer 1, polarized light is applied to a main surface 91 on the substrate 9 where the thin film is formed (the main surface 91 is a main surface to be measured on the (+Z) side in FIG. 1 and hereinafter, referred to as a "measurement surface 91"), and ellipsometry is performed on the basis of reflected light reflected on the measurement surface 91 to obtain a film thickness. In the present preferred embodiment, a thickness of a silicon oxide (SiO$_2$) film which is formed on the measurement surface 91 of the substrate 9 is obtained as an optical characteristic of the substrate 9 by the spectroscopic ellipsometer 1. In FIG. 1, a part of the structure of the spectroscopic ellipsometer 1 is shown cross-sectionally.

The spectroscopic ellipsometer 1 has a stage 2 which is a holding part for holding the substrate 9, a stage moving mechanism 21 for moving the stage 2 in parallel with the measurement surface 91 of the substrate 9, a stage elevating mechanism 24 for moving the stage 2 in a vertical direction (the Z direction in FIG. 1) perpendicular to the measurement surface 91 of the substrate 9, a lighting part 3 for directing polarized light to the measurement surface 91 of the substrate 9, the polarized light being inclined to the measurement surface 91, a light receiving part 4 for receiving reflected light of the polarized light which is emitted from the lighting part 3, a substrate observing part 5 which is used for position adjustment of the substrate 9 in a direction along the measurement surface 91 (i.e., the direction is the X direction and the Y direction in FIG. 1), and a control part 6 which is constituted of a CPU for performing various computations, a memory for storing various pieces of information and the like and controls the other constituent elements of the spectroscopic ellipsometer 1.

Figure 2:
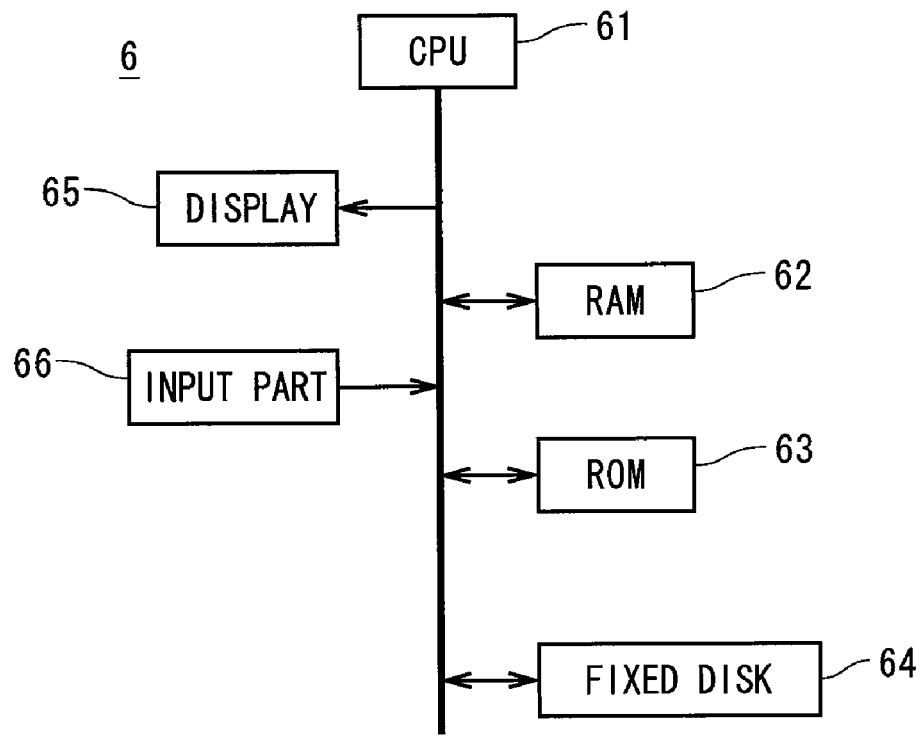
FIG. 2 is a view showing a constitution of a control part.

FIG. 2 is a view showing a constitution of the control part 6. As shown in FIG. 2, the control part 6 has a construction, like a general-type computer, in which a CPU 61 for performing various computations, a RAM 62 storing programs to be executed and serving as a work area for various computations, a ROM 63 for storing a basic program, a fixed disk 64 for storing various pieces of information, a display 65 for displaying various pieces of information to an operator, an input part 66 such as a keyboard and a mouse, and the like are all connected to one another.

Figure 3:
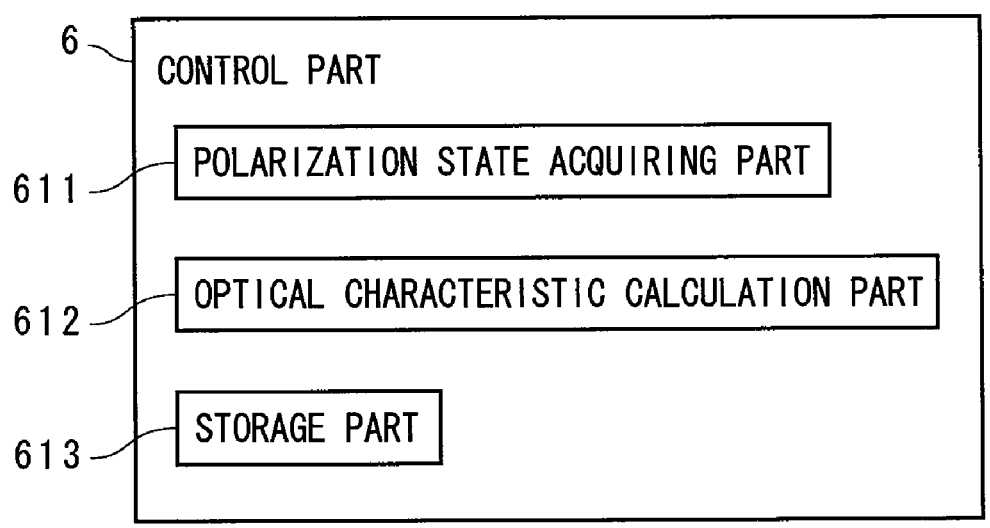
FIG. 3 is a block diagram showing functions of the control part.

FIG. 3 is a block diagram showing functions implemented through computations performed by the CPU 61 and the like in the control part 6 (see FIG. 2) in accordance with the program. A polarization state acquiring part 611, an optical characteristic calculation part 612, and a storage part 613 in FIG. 3 correspond to functions implemented by the CPU 61 and the like. These functions may be implemented by a plurality of computers.

The stage moving mechanism 21 shown in FIG. 1 has a Y-direction moving mechanism 22 for moving the stage 2 in the Y direction of FIG. 1 and an X-direction moving mechanism 23 for moving the stage 2 in the X direction. The Y-direction moving mechanism 22 has a motor 221 and a ball screw (not shown) connected with the motor 221, and with rotation of the motor 221, the X-direction moving mechanism 23 moves in the Y direction of FIG. 1 along guide rails 222. The X-direction moving mechanism 23 has the same constitution as the Y-direction moving mechanism 22, and with rotation of a motor 231, the stage 2 is moved by a ball screw (not shown) in the X direction along guide rails 232.

The lighting part 3 has a white light source 31 for emitting white light not including ultraviolet light (i.e., the white light source 31 is a light source for emitting a multiple wavelength light including lights of a plurality of (different) wavelengths and hereinafter, simply referred to as a "light source 31"). Out of the white light emitted from the light source 31, lights in a predetermined wavelength band (visible lights in a wavelength band where the minimum wavelength is equal to or larger than 400 nm and the maximum wavelength is equal to or smaller than 800 nm in the preferred embodiment) is used in later-discussed film thickness measurement on the measurement surface 91 of the substrate 9. In the following description, a wavelength band of light used in film thickness measurement is referred to as a "measurement wavelength band".

The lighting part 3 further has various optical elements (i.e., an ellipsoidal mirror 351, an infrared cut filter 352, an ellipsoidal mirror 353, a slit plate 354, a plane mirror 355 and an ellipsoidal mirror 356) for directing the light from the light source 31 and a polarized light generating part 32 for generating polarized light. The polarized light generated by the polarized light generating part 32 is directed to the substrate 9 to enter the measurement surface 91 of the substrate 9, the polarized light being inclined to the measurement surface 91 (at an incident angle of 70 degrees in the present preferred embodiment). The ellipsoidal mirror described here means an aspherical mirror whose reflective surface is a part of a rotationally symmetric ellipsoidal surface (spheroidal surface).

The polarized light generating part 32 has a polarizer 321 for acquiring a linearly polarized light from a light of each wavelength included in the white light emitted from the light source 31 and a wave retardation plate 322 which is positioned on an optical axis J1 between the polarizer 321 and the substrate 9 in the lighting part 3. In the wave retardation plate 322, a circularly polarized light is acquired from a light of a specific wavelength after passing through the polarizer 321 and elliptically polarized lights are acquired from lights of the other wavelengths. In other words, in the polarized light generating part 32, the circularly polarized light is acquired from the light of the specific wavelength included in a plurality of wavelengths in the measurement wavelength band and the elliptically polarized lights are acquired from the lights of the wavelengths other than the specific wavelength included in the plurality of wavelengths, to thereby generate a multiple wavelength polarized light. The wave retardation plate 322 is a wideband wave retardation plate where wavelength dependency of a phase difference is suppressed, and a phase difference between a p-polarized component and an s-polarized component in a wavelength band corresponding to visible light (i.e., a wavelength band where the minimum wavelength is almost equal to or larger than 360 nm and the maximum wavelength is equal to or smaller than 830 nm) is equal to or larger than 80 degrees and equal to or smaller than 100 degrees.

The light receiving part 4 has a rotating analyzer 41 where a reflected light of the multiple wavelength polarized light enters, the rotating analyzer 41 rotating around a central axis parallel to an optical axis J2 in the light receiving part 4, a spectrometer 42 for receiving a light directed from the rotating analyzer 41 to acquire spectral intensity (i.e., light intensity at each wavelength), and various optical elements (i.e., a slit plate 451, an ellipsoidal mirror 452, a plane mirror 453 and an aperture plate 454) for directing the reflected light reflected on the substrate 9 to the spectrometer 42.

In the spectroscopic ellipsometer 1, a rotation position of the rotating analyzer 41 and spectral intensity of the reflected light acquired by the spectrometer 42 are outputted to the polarization state acquiring part 611 (see FIG. 3) in the control part 6. In the polarization state acquiring part 611, a polarization state at each of the lights of the plurality of wavelengths in the measurement wavelength band out of the white light emitted from the lighting part 3, specifically, a phase difference between a p-polarized component and an s-polarized component at each wavelength and an angle whose tangent gives an amplitude ratio of these reflected polarized components (i.e., a complex amplitude ratio) are acquired on the basis of the rotation position of the rotating analyzer 41 and the output of the spectrometer 42.

The substrate observing part 5 has an observation light source 51 for emitting white light and a camera 52 for position adjustment of the substrate 9. Light emitted from the observation light source 51 enters the measurement surface 91 of the substrate 9 through a half mirror 53 and an objective lens 54 so as to be perpendicular to the measurement surface 91, and reflected light reflected on the substrate 9 is received by the camera 52 through the half mirror 53 and a lens 55. In the spectroscopic ellipsometer 1, the camera 52 picks up an image of a mark for position adjustment (so-called alignment mark) provided on the measurement surface 91 of the substrate 9. The control part 6 controls the X-direction moving mechanism 23 and the Y-direction moving mechanism 22 in the stage moving mechanism 21 on the basis of the image of the mark and performs position adjustment of the substrate 9 in the X direction and the Y direction.

Figure 4:
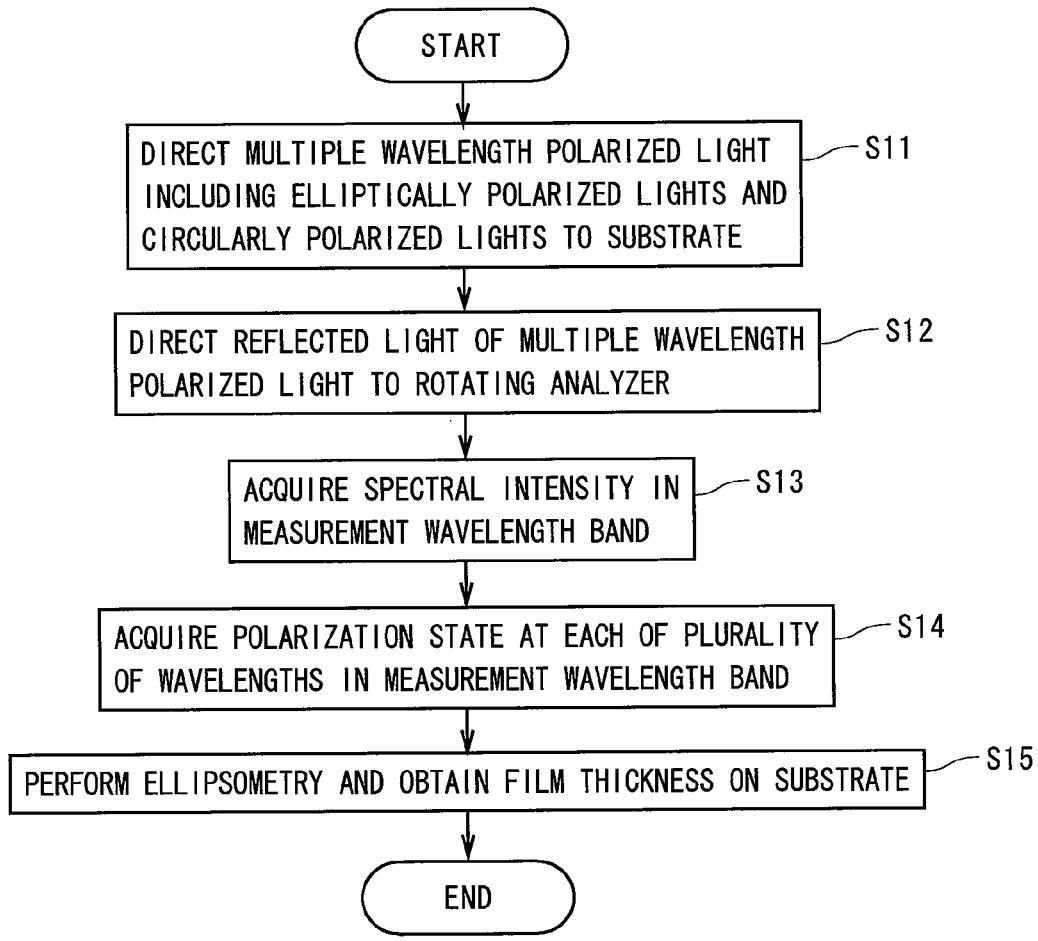
FIG. 4 is a flowchart showing a flow of calculation of a film thickness.

Next, discussion will be made on details of the lighting part 3 and the light receiving part 4 and a flow of calculation of a film thickness, which is performed in the spectroscopic ellipsometer 1. FIG. 4 is a flowchart showing a flow of calculation of a film thickness. In the lighting part 3 shown in FIG. 1, the white light emitted from the light source 31 is directed to an aperture of the slit plate 354 through the ellipsoidal mirror 351, the infrared cut filter 352, and the ellipsoidal mirror 353. In the slit plate 354, the shape of the aperture in a direction perpendicular to the optical axis J1 of the lighting part 3 has a rectangular shape with long sides parallel to the X axis and short sides orthogonal thereto. Light after passing through the aperture is directed to the plane mirror 355, gradually expanding at a predetermined angle.

The light from the slit plate 354 is reflected on the plane mirror 355 and further directed to the ellipsoidal mirror 356, and light reflected on the ellipsoidal mirror 356 is directed to the polarizer 321 in the polarized light generating part 32 while being collected. Then, linearly polarized lights of multiple wavelengths which are led out by the polarizer 321 pass the wave retardation plate 322 to generate a multiple wavelength polarized light which includes elliptically polarized lights and a circularly polarized light, and the multiple wavelength polarized light is applied to the irradiation region on the measurement surface 91 of the substrate 9 at an incident angle of 70 degrees (Step S11). In the present preferred embodiment, the irradiation region of the multiple wavelength polarized light on the substrate 9 is an approximately square region.

A reflected light of the multiple wavelength polarized light is drawn into the slit plate 451 in the light receiving part 4 and led out to the rotating analyzer 41 (Step S12). An aperture of the slit plate 451 has a rectangular shape with sufficiently long sides parallel to the X axis and short sides orthogonal thereto. This limits a range of reflection angle on the substrate 9 of the reflected light which is drawn into the slit plate 451 and the reflected light almost becomes parallel light. On the other hand, since most of the reflected light is not limited in the X direction, a sufficient amount of light for measurement is led to the rotating analyzer 41.

Linearly polarized lights are led out from the rotating analyzer 41 in accordance with a rotation position of the rotating analyzer 41. The linearly polarized lights are reflected on the ellipsoidal mirror 452 and directed to the plane mirror 453 to be incident on the spectrometer 42 through an aperture of the aperture plate 454 fixed on the spectrometer 42. The aperture of the aperture plate 454 is positioned at a position which is optically conjugate to the irradiation region on the measurement surface 91 of the substrate 9. In the spectrometer 42, the light directed from the rotating analyzer 41 is received and spectrally split with high wavelength resolution, to acquire light intensity at each of the lights of the plurality of wavelengths in the measurement wavelength band which is included in the reflected light reflected on the measurement surface 91 (i.e., to acquire spectral intensity in the measurement wavelength band) (Step S13).

The spectral intensity of the reflected light acquired by the spectrometer 42 is outputted to the polarization state acquiring part 611 (see FIG. 3) in the control part 6, and a polarization state at each of the plurality of wavelengths in the measurement wavelength band, specifically, a phase difference between a p-polarized component and an s-polarized component at each wavelength and an angle whose tangent gives an amplitude ratio of these reflected polarized components (i.e., a complex amplitude ratio) are acquired on the basis of the rotation position of the rotating analyzer 41 which is outputted from the rotating analyzer 41 and the output of the spectrometer 42 (i.e., the spectral intensity) (Step S14). The polarization state at each wavelength of the reflected light is outputted to the optical characteristic calculation part 612 (see FIG. 3) from the polarization state acquiring part 611. In the optical characteristic calculation part 612, ellipsometry is performed on the basis of the polarization state at each wavelength of the reflected light, to obtain a thickness of the film formed on the measurement surface 91, the thickness of the film being at least one optical characteristic of the substrate 9 (Step S15).

Next discussion will be made on details of film thickness calculation by the optical characteristic calculation part 612. In the polarization state acquiring part 611 in the spectroscopic ellipsometer 1, a tan $(\phi_{out\_meas})$ which is tangent of a complex amplitude ratio $\phi_{out\_meas}$ and cos $(\Delta_{out\_meas})$ which is cosine of a phase difference $\Delta_{out\_meas}$ are acquired for a light of each wavelength in the measurement wavelength band, the light being received by the spectrometer 42, as measurement values representing the complex amplitude ratio and the phase difference, to be transmitted to the optical characteristic calculation part 612.

In the storage part 613 (see FIG. 3) in the control part 6, a complex amplitude ratio $\phi_{in}$ and a phase difference $\Delta_{in}$ of an incident light at each of the plurality of wavelengths in the measurement wavelength band (i.e., the incident light is the elliptically polarized lights or the circularly polarized light which are incident on the substrate 9 from the polarized light generating part 32) are stored in advance. In the spectroscopic ellipsometer 1, relationships between changes of the polarization state in reflection on the substrate 9 (i.e., changes $\phi_{wa\_meas}$, $\Delta_{wa\_meas}$ of the complex amplitude ratio and the phase difference between the p-polarized component and the s-polarized component) and the above $\phi_{out\_meas}$, $\Delta_{out\_meas}$, $\phi_{in}$, $\Delta_{in}$ are represented by Eqs. 1 and 2.

$$\tan(\phi_{out\_meas}) = \tan(\phi_{in}) \times \tan(\phi_{wa\_meas}) \quad \text{(Eq. 1)}$$

$$\cos(\Delta_{out\_meas}) = \cos(\Delta_{in} + \Delta_{wa\_meas}) \quad \text{(Eq. 2)}$$

In a normal spectroscopic ellipsometer of a rotating analyzer method where an incident light is linearly polarized lights, since values of $\phi_{in}$ and $\Delta_{in}$ in all the wavelengths of the incident light are 45 degrees and 0 degrees, respectively, tan ($\phi_{wa\_meas}$) and cos ($\Delta_{wa\_meas}$) are obtained as values which are equal to tan ($\phi_{out\_meas}$) and cos ($\Delta_{out\_meas}$), respectively. In the normal spectroscopic ellipsometer, assuming a film thickness on a substrate, theoretical values $\phi_{wa\_calc}$, $\Delta_{wa\_calc}$ of changes of a polarization state in reflection on the substrate (i.e., changes of the complex amplitude ratio and the phase difference between the p-polarized component and the s-polarized component) are obtained by computation, and a sum of squares of residuals between (a value obtained based on) a measurement value $\phi_{wa\_meas}(\lambda)$ at each wavelength $\lambda$ and cos ($\Delta_{wa\_means}(\lambda)$) which is cosine of $\Delta_{wa\_means}(\lambda)$ and theoretical values $\phi_{wa\_calc}(\lambda)$, cos ($\Delta_{wa\_calc}(\lambda)$) corresponding to the measurement values is obtained by e.g., E1 in Eq. 3 (i.e., the sum of squares of residuals is a value based on the differences between the measurement values and the theoretical values and hereinafter, simply referred to as a "differential value").

$$E1 = \sum_{\lambda} \left( \left(\frac{\phi_{wa\_means}(\lambda) - \phi_{wa\_calc}(\lambda)}{\pi/2}\right)^2 + (\cos(\Delta_{wa\_means}(\lambda)) - \cos(\Delta_{wa\_calc}(\lambda)))^2 \right) \quad \text{(Eq. 3)}$$

Then, the film thickness is used as a variable, the differential value E1 is obtained with changing the theoretical values $\phi_{wa\_calc}(\lambda)$ $\Delta_{wa\_calc}(\lambda)$ of changes of the polarization state in reflection on the substrate, and a film thickness where the differential value E1 becomes minimum is acquired as a thickness of a film formed on the substrate by a linear regression analysis.

On the other hand, in the spectroscopic ellipsometer 1 according to the preferred embodiment, since the lights of the plurality of wavelengths in the measurement wavelength band, the plurality of lights entering the substrate 9, are the elliptically polarized lights (only a light of the specific wavelength is the circularly polarized light), the complex amplitude ratio $\phi_{in}$ and the phase difference $\Delta_{in}$ at each of the plurality of wavelengths of the incident light become various values. In the optical characteristic calculation part 612 (see FIG. 3) in the spectroscopic ellipsometer 1, as discussed above, $\phi_{in}$, $\Delta_{in}$ at each wavelength are obtained in advance and stored in the storage part 613, and a change $\phi_{wa\_meas}$ of the complex amplitude ratio between the p-polarized component and the s-polarized component in reflection on the substrate is obtained from the above Eq. 1 on the basis of $\phi_{in}$ at each wavelength and tan ($\phi_{out\_meas}$) at each wavelength which is acquired by the polarization state acquiring par 611. However, since plus or minus of $\Delta_{out\_meas}$ cannot be determined from the value of cos ($\Delta_{out\_meas}$) at each wavelength which is acquired by the polarization state acquiring part 611, a phase difference $\Delta_{wa\_meas}$ between the p-polarized component and the s-polarized component in reflection on the substrate and cos ($\Delta_{wa\_meas}$) which is cosine of the phase difference $\Delta_{wa\_meas}$ cannot be obtained even if using the above Eq. 2.

For this reason, in the optical characteristic calculation part 612, assuming a film thickness on the measurement surface 91 of the substrate 9, theoretical values $\phi_{wa\_calc}$, $\Delta_{wa\_calc}$ of changes of the polarization state in reflection on the substrate 9 (i.e., changes of the complex amplitude ratio and the phase difference between the p-polarized component and the s-polarized component) are obtained at the plurality of wavelengths in the measurement wavelength band by computation, and cos ($\Delta_{out\_calc}$) at each wavelength in the measurement wavelength band (i.e., a theoretical value which is obtained correspondingly to the measurement value cos ($\Delta_{out\_meas}$) representing the complex amplitude ratio acquired by the polarization state acquiring part 611) is obtained by Eq. 4, with using $\Delta_{in}$ stored in the storage part 613 in advance and $\Delta_{wa\_calc}$.

$$\cos(\Delta_{out\_calc}) = \cos(\Delta_{in} + \Delta_{wa\_calc}) \quad \text{(Eq. 4)}$$

A differential value based on the differences between $\phi_{wa\_meas}(\lambda)$, cos ($\Delta_{out\_meas}(\lambda)$) which are measurement values (or values obtained based on the measurement values) at each wavelength $\lambda$ in the measurement wavelength band acquired by the polarization state acquiring part 611 and $\phi_{wa\_calc}(\lambda)$, cos ($\Delta_{out\_calc}(\lambda)$) which are theoretical values corresponding to the measurement values, is obtained by e.g., E2 in Eq. 5.

$$E2 = \sum_{\lambda} \left( \left(\frac{\phi_{wa\_means}(\lambda) - \phi_{wa\_calc}(\lambda)}{\pi/2}\right)^2 + (\cos(\Delta_{out\_means}(\lambda)) - \cos(\Delta_{out\_calc}(\lambda)))^2 \right) \quad \text{(Eq. 5)}$$

In the optical characteristic calculation part 612, a film thickness which is at least one optical characteristic of the substrate 9 is used as a variable. By changing the film thickness, the theoretical value $\phi_{wa\_calc}(\lambda)$ of change of the complex amplitude ratio in reflection on the substrate 9 is changed, the theoretical value $\Delta_{wa\_calc}(\lambda)$ of change of the phase difference is changed, and then cos ($\Delta \text{out}_{calc}(\lambda)$) is changed (see Eq. 4). The differential value E2 is obtained with changing the film thickness, and a film thickness where the differential value E2 becomes minimum is acquired as a thickness of the film formed on the measurement surface 91 of the substrate 9 (i.e., as a value of the optical characteristic) by the linear regression analysis.

Next discussion will be made on comparison of the measurement accuracies between the spectroscopic ellipsometer 1 according to the preferred embodiment and a spectroscopic ellipsometer of a comparative example. The spectroscopic ellipsometer of the comparative example is a normal spectroscopic ellipsometer of the rotating analyzer method where an incident light is linearly polarized lights.

FIGS. 5A to 5E are graphs each showing a relationship between an amount of change of a signal representing change of a phase difference $\Delta$ (specifically, a square of an amount of change of the phase difference $\Delta$, and hereinafter referred to as "phase difference change amount") and a wavelength of the incident light in a case where a film thickness of a measurement surface of a substrate is changed at 0.1 nm, a silicon oxide film with a thickness of 3 nm, 5 nm, 10 nm, 15 nm, or 20 nm being formed on the measurement surface in each of FIGS. 5A to 5E. The phase difference change amount in each of FIGS. 5A to 5E is obtained from computation.

A solid line 81 in FIGS. 5A to 5E represents a phase difference change amount in a case that a circularly polarized light (i.e., a polarized light with a phase difference of 90 degrees) is an incident light at each wavelength. A thin solid line 82 represents a phase difference change amount in a case that a linearly polarized light (i.e., polarized light with a phase difference of 0 degrees) is an incident light at each wavelength (i.e., the thin solid line 82 represents the phase difference change amount in the spectroscopic ellipsometer of the comparative example). In the spectroscopic ellipsometer 1 according to the preferred embodiment, since the incident light is the elliptically polarized lights with a phase difference which is equal to or larger than 80 degrees and equal to or smaller than 100 degrees, the phase difference change amount in the spectroscopic ellipsometer 1 becomes a value which is between the solid line 81 and the thin solid line 82 in FIGS. 5A to 5E and is closer to the solid line 81 than the thin solid line 82. In a specific wavelength where the incident light is a circularly polarized light among the measurement wavelength band, the phase difference change amount in the spectroscopic ellipsometer 1 becomes a value on the solid line 81.

Figure 5A:
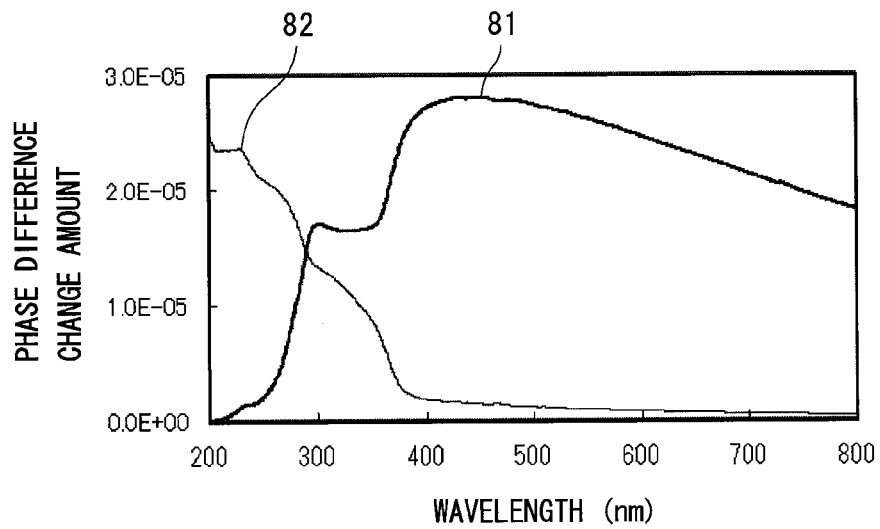
FIGS. 5A to 5E are graphs each showing a relationship between a phase difference change amount and a wavelength of an incident light.
Figure 5B:
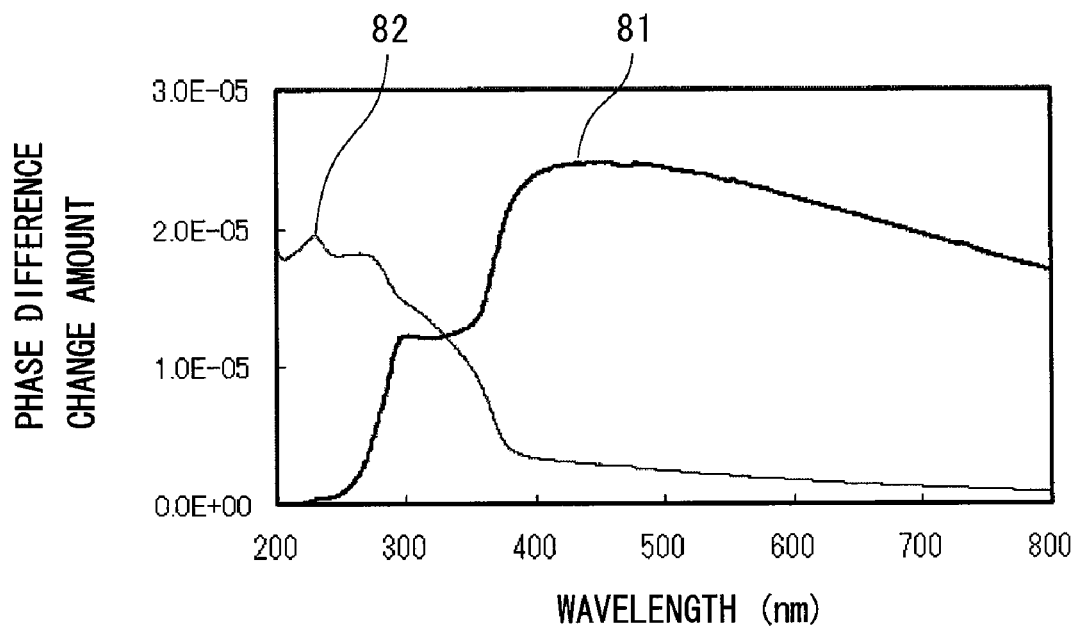
Figure 5C:
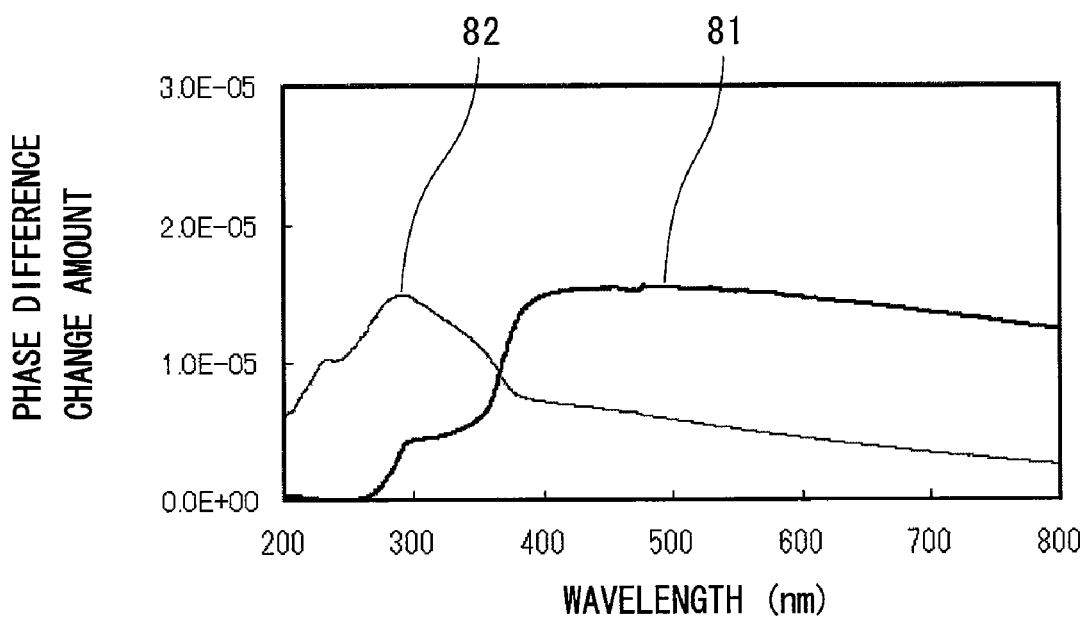

As shown in FIGS. 5A to 5C, in the case that the film thickness on the substrate is equal to or smaller than 10 nm, the phase difference change amount of the solid line 81 (the circularly polarized light) in the measurement wavelength band (i.e., the wavelength band where the minimum wavelength is equal to or larger than 400 nm and the maximum wavelength is equal to or smaller than 800 nm) in the spectroscopic ellipsometer 1 is larger than that of the thin solid line 82 (the linearly polarized lights). Therefore, the phase difference change amount in the spectroscopic ellipsometer 1 (the elliptically polarized lights) according to the preferred embodiment is larger than that in the spectroscopic ellipsometer of the comparative example (the linearly polarized light). In the spectroscopic ellipsometer 1, it is possible to perform ellipsometry on the substrate 9 with high accuracy and achieve high precision-film thickness measurement on the measurement surface 91 of the substrate 9, as compared with the spectroscopic ellipsometer of the comparative example.

Figure 5D:
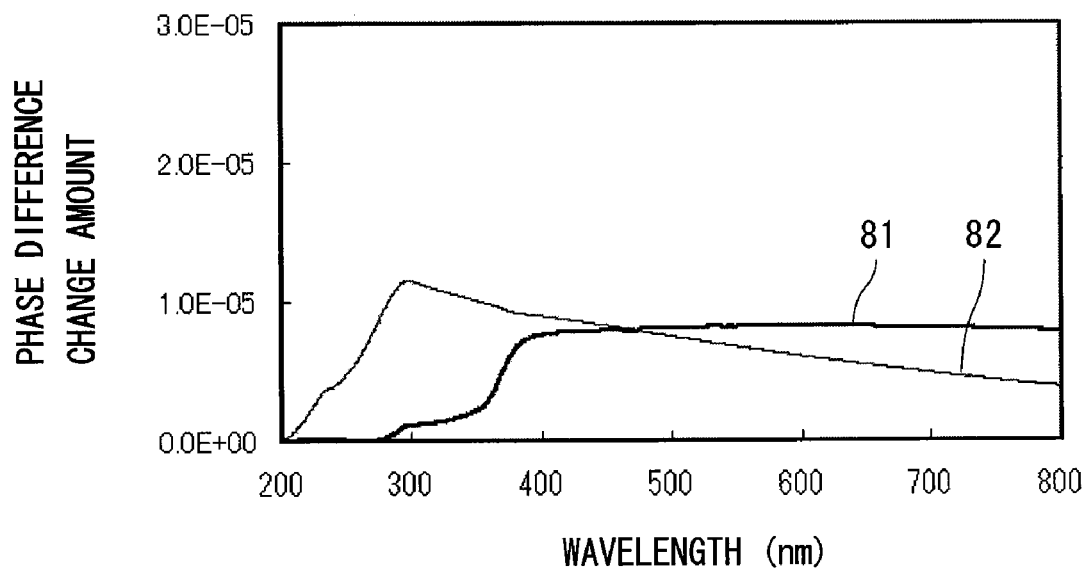
Figure 5E:
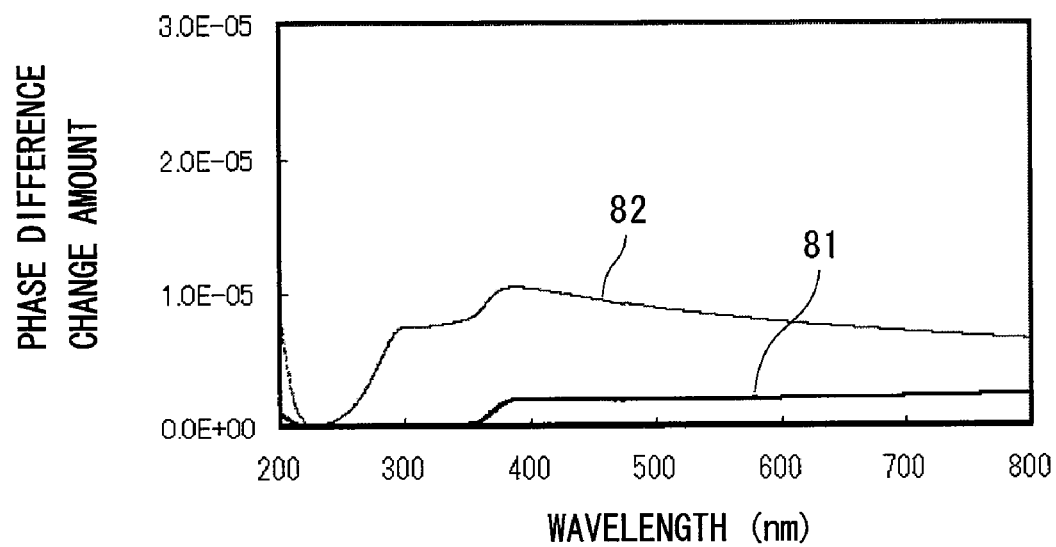

As shown in FIG. 5D, in the case that the film thickness on the substrate is 15 nm, the phase difference change amount of the solid line 81 (the circularly polarized light) in the measurement wavelength band is not greatly different from that of the thin solid line 82 (the linearly polarized light). In the wavelength band where the minimum wavelength is equal to or larger than 450 nm, the solid line 81 is slightly larger than the thin solid line 82. As shown in FIG. 5E, in the case that the film thickness on the substrate is 20 nm, the phase difference change amount of the thin solid line 82 (the linearly polarized light) in the measurement wavelength band is larger than that of the solid line 81 (the circularly polarized light).

If the film thickness becomes larger, an amount of change of a signal representing change of the complex amplitude ratio φ in a case where the film thickness is changed at 0.1 nm. Therefore, in the case that the film thickness is equal to or larger than 15 nm, it is possible to perform high precision-film thickness measurement in any cases where the incident light is the linearly polarized light, the elliptically polarized light, or the circularly polarized light. The spectroscopic ellipsometer 1 according to the present preferred embodiment is considered to be especially suitable for film thickness measurement of a substrate on which a very fine film with a thickness which is equal to or smaller than 10 nm is formed (it is relatively difficult in the spectroscopic ellipsometer of the comparative example to perform high precision ellipsometry on the very fine film).

In the spectroscopic ellipsometer 1 according to the present preferred embodiment, as discussed above, since the phase difference between the p-polarized component and the s-polarized component at each of the plurality of wavelengths in the measurement wavelength band is equal to or larger than 80 degrees and equal to or smaller than 100 degrees in the multiple wavelength polarized light generated in the polarized light generating part 32, polarization characteristics of the elliptically polarized lights included in the multiple wavelength polarized light can be close to those of the circularly polarized light. Thus, in ellipsometry on the thin film (especially, the film with a thickness which is equal to or smaller than 10 nm) formed on the substrate 9, the phase difference change amount in the measurement wavelength band becomes larger and the accuracy of ellipsometry on the substrate 9 and the accuracy of film thickness measurement on the measurement surface 91 are improved.

In the spectroscopic ellipsometer 1, the circularly polarized light (i.e., the polarized light where the phase difference between the p-polarized component and the s-polarized component is 90 degrees) is acquired from the light of the specific wavelength included in the plurality of wavelengths in the measurement wavelength band by the polarized light generating part 32, and the circularly polarized light is included in the multiple wavelength polarized light incident on the substrate 9. Thus, in ellipsometry on the thin film (especially, the film with a thickness of 10 nm or less) formed on the substrate 9, the phase difference change amount in the above specific wavelength included in the measurement wavelength band becomes even larger and the accuracy of ellipsometry on the substrate 9 and the accuracy of film thickness measurement on the measurement surface 91 are further improved.

In the lighting part 3 in the spectroscopic ellipsometer 1, the white light source is used as the light source 31, and ellipsometry on the substrate 9 is performed with the light in the predetermined wavelength band (i.e., the measurement wavelength band) out of the white light emitted from the light source 31. By using the white light in such a manner, it is possible to easily obtain the light of the multiple wavelength, which is applied to the substrate 9, and to simplify structures of the light source 31 and the lighting part 3 as compared with a spectroscopic ellipsometer for performing ellipsometry with use of light in a special wavelength band other than the white light. Since the minimum wavelength of the measurement wavelength band used for ellipsometry is equal to or larger than 400 nm and the maximum wavelength of that is equal to or smaller than 800 nm, it is possible to easily get the wave retardation plate 322 which is the wideband wave retardation plate corresponding to the measurement wavelength band.

In the spectroscopic ellipsometer 1, the minimum wavelength of the measurement wavelength band is equal to or larger than 400 nm and ellipsometry on the thin film formed on the substrate 9 can be performed with high accuracy without using ultraviolet light. Thus, optical elements used in an optical system can be simplified to reduce the manufacturing cost of the apparatus, as compared with a spectroscopic ellipsometer for performing ellipsometry with use of reflected light of ultraviolet light which is applied to the substrate 9.

Although there is a case where usage environment is limited to vacuum atmosphere in a spectroscopic ellipsometer using ultraviolet light of a short wavelength (which is, e.g., 200 nm or less), the spectroscopic ellipsometer 1 according to the preferred embodiment is usable in normal atmosphere and it is therefore possible to simplify the structure of the apparatus as compared with the spectroscopic ellipsometer using the ultraviolet light of the short wavelength, to further reduce the manufacturing cost of the apparatus. Since ultraviolet light is not applied to the substrate 9, it is possible to prevent influences of the ultraviolet light on the substrate 9, such as damage and deterioration of the film on the substrate 9. In a case where a light source for emitting light including ultraviolet light is provided in the lighting part 3, it is preferable that a filter for cutting the ultraviolet light is provided on the optical axis J1 between the light source and the substrate 9.

As shown in FIG. 5A, considering that, in the wavelength band where the minimum wavelength is 300 nm or more, the phase difference change amount of the circularly polarized light shown in the solid line 81 is larger than that of the linearly polarized light shown in the thin solid line 82, the minimum wavelength of the measurement wavelength band may be equal to or larger than 300 nm. In this case, ellipsometry on the substrate 9 can be performed with high accuracy without almost using ultraviolet light and as a result, it is possible to achieve simplification of the structure of the apparatus and suppress influences of the ultraviolet light on the substrate 9.

In the lighting part 3 in the spectroscopic ellipsometer 1, the polarized light generating part 32 has the polarizer 321 for acquiring the linearly polarized lights from the lights of the plurality of wavelengths in the measurement wavelength band and the wave retardation plate 322 for acquiring the elliptically polarized lights or the circularly polarized light from the linearly polarized lights which are led out by the polarizer 321, and therefore a structure for generating the multiple wavelength polarized light can be easily formed.

In the control part 6, the optical characteristic calculation part 612 obtains a film thickness on the basis of the differences between measurement values $\phi_{wa\_meas}(\lambda)$, $\cos(\Delta_{out\_meas}(\lambda))$ at a plurality of wavelengths $\lambda$ in the measurement wavelength band and theoretical values $\phi_{wa\_calc}(\lambda)$, $\cos(\Delta_{out\_calc}(\lambda))$, with using change of the complex amplitude ratio between the p-polarized component and the s-polarized component in reflection on the substrate 9 and the phase difference between the p-polarized component and the s-polarized component, which is acquired by the polarization sate acquiring part 611, to thereby easily achieve ellipsometry by the rotating analyzer method using the elliptically polarized lights.

Though the preferred embodiment of the present invention has been discussed above, the present invention is not limited to the above-discussed preferred embodiment, but allows various variations.

For example, in the spectroscopic ellipsometer 1, the circularly polarized light is not necessarily included in the lights of the plurality of wavelengths in the measurement wavelength band out of the multiple wavelength polarized light generated by the polarized light generating part 32 in the lighting part 3, but only the elliptically polarized lights may be acquired by the polarized light generating part 32, from the lights of the plurality of wavelengths in the measurement wavelength band, the lights being emitted from the light source 31. Also in this case, it is possible to perform ellipsometry on the substrate 9 with high accuracy similarly to the above preferred embodiment.

In the optical characteristic calculation part 612, there may be a case where a theoretical value $\phi_{out\_calc}(\lambda)$ at each wavelength $\lambda$ corresponding to a measurement value $\phi_{out\_means}(\lambda)$ of a complex amplitude ratio between a p-polarized component and an s-polarized component, which is acquired by the polarization sate acquiring part 611, is obtained on the basis of $\phi_{wa\_calc}(\lambda)$ (see Eq. 5) which is obtained at each wavelength in the measurement wavelength band by computation, and a differential value E3 in calculation of a film thickness is obtained on the basis of the difference between the above measurement value $\phi_{out\_means}(\lambda)$ and the theoretical value $\phi_{out\_calc}(\lambda)$, as represented in Eq. 6.

$$E3 = \sum_{\lambda} \left( \left(\frac{\phi_{out\_means}(\lambda) - \phi_{out\_calc}(\lambda)}{\pi/2}\right)^2 + (\cos(\Delta_{out\_means}(\lambda)) - \cos(\Delta_{out\_calc}(\lambda)))^2 \right) \quad \text{(Eq. 6)}$$

Also in this case, similarly to the above preferred embodiment, a film thickness on the substrate 9 is used as a variable in the optical characteristic calculation part 612, the differential value E3 is obtained with changing the film thickness, and a film thickness where the differential value E3 becomes minimum is acquired as a thickness of the film formed on the measurement surface 91 of the substrate 9 by the linear regression analysis. Thus, it is possible to easily achieve ellipsometry by the rotating analyzer method using the elliptically polarized lights and achieve film thickness measurement on the measurement surface 91 of the substrate 9 with high accuracy.

Calculation of film thickness in the optical characteristic calculation part 612 may be performed by an analytical technique other than the linear regression analysis. Calculation of film thickness is not necessarily performed on the basis of Eq. 5 or 6. A film thickness of the substrate 9 may be obtained by another technique based on the differences between measurement values (i.e., $\phi_{out\_means}$ and $\Delta_{out\_means}$, or $\phi_{wa\_means}$ and $\Delta_{out\_means}$) in the plurality of wavelengths in the measurement wavelength band and theoretical values (i.e., $\phi_{out\_calc}$ and $\Delta_{out\_calc}$, or $\phi_{wa\_calc}$ and $\Delta_{out\_calc}$) where the film thickness of the substrate 9 is a variable, the measurement values representing the phase difference between the p-polarized component and the s-polarized component and the complex amplitude ratio between the p-polarized component and the s-polarized component or representing the phase difference between the p-polarized component and the s-polarized component and change of the complex amplitude ratio between the p-polarized component and the s-polarized component in reflection on the substrate 9.

In the spectroscopic ellipsometer 1, a refractive index of the film on the substrate 9 may be obtained as an optical characteristic of the substrate 9 on the basis of spectral intensity acquired by the spectrometer, instead of the film thickness of the substrate 9, or both of the thickness and the refractive index of the film formed on the substrate 9 may be obtained. Various optical characteristics other than the film thickness and the refractive index (e.g., a surface state or an optical constant of the substrate 9) may be obtained, and ellipsometry on a measurement surface of an object other than the semiconductor substrate may be performed.

While the invention has been shown and described in detail, the foregoing description is in all aspects illustrative and not restrictive. It is therefore understood that numerous modifications and variations can be devised without departing from the scope of the invention.

This application claims priority benefit under 35 U.S.C. Section 119 of Japanese Patent Application No. 2007-276106 filed in the Japan Patent Office on Oct. 24, 2007, the entire disclosure of which is incorporated herein by reference.

What is claimed is:

1. A spectroscopic ellipsometer, comprising:
   a light source;

a polarized light generating part for generating a multiple wavelength polarized light directed to an object by acquiring elliptically polarized lights from lights of a plurality of wavelengths, said lights being emitted from said light source, or by acquiring a circularly polarized light from a light of a specific wavelength included in said plurality of wavelengths and acquiring an elliptically polarized light from a light of another wavelength included in said plurality of wavelengths;

a rotating analyzer where a reflected light of said multiple wavelength polarized light enters, said rotating analyzer rotating around a central axis parallel to an optical axis;

a spectrometer for receiving a light directed from said rotating analyzer to acquire spectral intensity; and a polarization state acquiring part for acquiring a polarization state at each of said plurality of wavelengths of said reflected light on the basis of output of said spectrometer.

2. The spectroscopic ellipsometer according to claim 1, wherein
said polarized light generating part comprises:
a polarizer for acquiring linearly polarized lights from said lights of said plurality of wavelengths; and
a wave retardation plate for acquiring an elliptically polarized light or a circularly polarized light from each of said linearly polarized lights.

3. The spectroscopic ellipsometer according to claim 2, further comprising
a calculation part for obtaining a value of at least one optical characteristic of said object on the basis of differences between measurement values in said plurality of wavelengths and theoretical values where said at least one optical characteristic is a variable, said measurement values representing a phase difference between a p-polarized component and an s-polarized component and a complex amplitude ratio between a p-polarized component and an s-polarized component or representing said phase difference between said p-polarized component and said s-polarized component and change of a complex amplitude ratio between a p-polarized component and an s-polarized component in reflection on said object.

4. The spectroscopic ellipsometer according to claim 3, wherein
said at least one optical characteristic includes a thickness of a film formed on said object or a refractive index of said film.

5. The spectroscopic ellipsometer according to claim 2, wherein
said polarized light generating part acquires a circularly polarized light from a light of a specific wavelength included in said plurality of wavelengths.

6. The spectroscopic ellipsometer according to claim 2, wherein
said light source is a white light source, and
said lights of said plurality of wavelengths are included in a predetermined wavelength band out of white light which is emitted from said light source.

7. The spectroscopic ellipsometer according to claim 6, wherein
a minimum wavelength of said predetermined wavelength band is equal to or larger than 300 nm.

8. The spectroscopic ellipsometer according to claim 1, wherein
a calculation part for obtaining a value of at least one optical characteristic of said object on the basis of differences between measurement values in said plurality of wavelengths and theoretical values where said at least one optical characteristic is a variable, said measurement values representing a phase difference between a p-polarized component and an s-polarized component and a complex amplitude ratio between a p-polarized component and an s-polarized component or representing said phase difference between said p-polarized component and said s-polarized component and change of a complex amplitude ratio between a p-polarized component and an s-polarized component in reflection on said object.

9. The spectroscopic ellipsometer according to claim 8, wherein
said at least one optical characteristic includes a thickness of a film formed on said object or a refractive index of said film.

10. The spectroscopic ellipsometer according to claim 8, wherein
said polarized light generating part acquires a circularly polarized light from a light of a specific wavelength included in said plurality of wavelengths.

11. The spectroscopic ellipsometer according to claim 8, wherein
said light source is a white light source, and
said lights of said plurality of wavelengths are included in a predetermined wavelength band out of white light which is emitted from said light source.

12. The spectroscopic ellipsometer according to claim 11, wherein
a minimum wavelength of said predetermined wavelength band is equal to or larger than 300 nm.

13. The spectroscopic ellipsometer according to claim 1, wherein
said polarized light generating part acquires a circularly polarized light from a light of a specific wavelength included in said plurality of wavelengths.

14. The spectroscopic ellipsometer according to claim 13, wherein
said light source is a white light source, and
said lights of said plurality of wavelengths are included in a predetermined wavelength band out of white light which is emitted from said light source.

15. The spectroscopic ellipsometer according to claim 14, wherein
a minimum wavelength of said predetermined wavelength band is equal to or larger than 300 nm.

16. The spectroscopic ellipsometer according to claim 1, wherein
said light source is a white light source, and
said lights of said plurality of wavelengths are included in a predetermined wavelength band out of white light which is emitted from said light source.

17. The spectroscopic ellipsometer according to claim 16, wherein
a minimum wavelength of said predetermined wavelength band is equal to or larger than 300 nm.

* * * * *